3,563,851
WATER RESISTANT VINYL ACETATE CO-
POLYMER ADHESIVE COMPOSITIONS
Walter B. Armour, Plainfield, N.J., Albert I. Goldberg,
Englefield Green, Surrey, England, and Victor Jasinski,
South Plainfield, N.J., assignors to National Starch and
Chemical Corporation, New York, N.Y., a corporation
of Delaware
No Drawing. Continuation-in-part of application Ser. No.
451,022, Apr. 26, 1965. This application Mar. 27, 1968,
Ser. No. 716,368
Int. Cl. C08f 45/24; B22b 27/30
U.S. Cl. 161—251                                    3 Claims

ABSTRACT OF THE DISCLOSURE

Adhesive compositions characterized by their outstanding water resistance, said compositions comprising a mixture of: (a) an aqueous emulsion of a vinyl acetate copolymer; (b) polyvinyl alcohol; and (c) an acidic metal salt curing agent.

---

This application is a continuation-in-part of our application, Ser. No. 451,022, filed Apr. 26, 1965, and assigned to the assignee of the subject application.

It is the object of this invention to provide stable vinyl acetate copolymer emulsion compositions capable of yielding adhesive bonds which exhibit optimum water resistance and high strength. A further object of this invention involves the preparation of adhesives which may be characterized by their ability to rapidly set at ambient or elevated temperatures and which are suitable for diverse applications. Other objects will become apparent from the following description.

As is well known in the art, modern adhesives are prepared from a wide variety of synthetic organic polymers, many of which are often blended so as to provide adhesive compositions displaying specific properties desired by the practitioner. Most adhesives are ordinarily classified as being either thermoplastic or thermosetting. Thus, thermosetting adhesives are formulated with resins which, by means of a chemical reaction, solidify or set on heating and cannot be softened on further heating. Thermoplastic adhesives, on the other hand, are made with resins which may be softened by heat, and then regain their original properties upon cooling.

Aqueous emulsions of the homo- and copolymers of vinyl acetate are widely used as adhesives. Often such emulsions can be used with little, if any, modification. Usually, however, it is necessary to alter either their physical properties and/or their application characteristics. One of the more frequently used modifiers for vinyl acetate homo- or coplymer emulsions is polyvinyl alcohol. Thus, when incorporated into a vinyl acetate homo- of copolymer emulsion, polyvinyl alcohol aids in increasing its viscosity and in improving its machinability and remoistenability.

When utilized for wood bonding adhesives, the blends of polyvinyl alcohol with vinyl acetate homo- or copolymers provide excellent bond strength, fast setting, colorless glue lines, and ease of application, etc. Despite the latter improvements, it is also known that the adhesive bonds derived from conventional vinyl acetate homo- or copolymer emulsions, as well as from the above described vinyl acetate homo- or copolymer emulsions which contain polyvinyl alcohol, are inherently poor with respect to their water resistance. Thus, this property which is required in adhesive bonds which are to be exposed to moisture in ordinary usage or which may be exposed to the excessive moisture and varying temperature conditions encountered during outdoor exposure, has been generally inadequate in the polyvinyl acetate adhesives heretobefore available.

In addition to adhesives based on homo- or copolymers of vinyl acetate, various other resins have been used for the preparation of water resistant thermosetting adhesives. Such other resins include resorcinol-formaldehyde, urea-formaldehyde, melamine-formaldehyde, and phenol-formaldehyde resins. One of the major disadvantages of the thermosetting adhesives derived from the latter resins is that they require hot pressing or extended pressing at ambient temperatures. Thus, melamine-formaldehyde and phenol-formaldehyde adhesives require pressing at temperatures above 200° F. and, although resorcinol-formaldehyde and urea-formaldehyde adhesives cure at temperatures as low as 75° F., they require press times in excess of eight hours. Other general disadvantages include reduced storage stability, shortened pot life, and the formation of colored glue lines.

It was anticipated that the aforementioned difficulties would be substantially overcome through use of the adhesive compositions disclosed in the above identified patent application, i.e. adhesive compositions based upon homo- or copolymers of vinyl acetate. However, since the filing of the parent application, we have found that the resistance to boiling water on the part of the adhesive bonds derived from adhesive formulations based upon the homopolymer of vinyl acetate, i.e. polyvinyl acetate, was substantially inferior to that attained by the use of products which were based upon a vinyl acetate copolymer system.

The present invention provides novel adhesive compositions, wherein certain acidic, metal salt curing agents are added to the aqueous emulsions of copolymers of vinyl acetate, said emulsions also containing polyvinyl alcohol as a protective hydrocolloid therein. These adhesives overcome all of the deficiencies found in the previously described system, thus making it possible for the practitioner to make laminations rapidly at ambient temperatures while, nonetheless, developing an outstanding degree of water resistance in the resulting adhesive bonds.

The presence of such acidic, metal salts in the latter emulsions has been shown to be most effective in decreasing the water sensitivity of adhesives derived therefrom. Thus, while the presence of hydrophyllic emulsifiers ordinarily has adverse effects upon the water resistance of the adhesives ultimately derived from the polymer emulsions containing these materials, in contrast, the adhesives resulting from the products of this invention, surprisingly retain their excellent adhesive properties and physical structure even after prolonged exposure to moisture.

In addition, the adhesive products of our invention yield tacky films which do not require the application of excessive pressure for their successful bonding to a wide variety of solid substrates.

Regarding the polymers of vinyl acetate which may be used in the process of our invention, these may include copolymers of vinyl acetate with any polymerizable monomer, such for example as copolymers containing vinyl acetate in combination with: (1) alkyl esters of acrylic and methacrylic acid such as methyl acrylate, methyl methacrylate, ethyl acrylate, ethyl methacrylate, etc.; (2) substituted or unsubstituted mono or dialkyl esters of alpha, beta-unsaturated dicarboxylic acids such as the substituted or unsubstituted mono and dibutyl, mono and diethyl maleate esters as well as the corresponding fumarates, itaconates and citraconates; (3) alhpa, beta-unsaturated carboxylic acids such as crotonic, acrylic, methacrylic, maleic, itaconic, and citraconic, acids; (4) vinyl halides such as vinyl chloride; (5) vinylidene halides such as vinylidene chloride; and (6) amides of alpha, beta-unsaturated carboxylic acids and their N-alkylol derivatives such as acryamide and N-methylol acrylamide.

In addition to copolymers of vinyl acetate with one of the above described comonomers, it is also possible to use polymers of vinyl acetate wherein the vinyl acetate is copolymerized with any two, or more, of these comonomers. It is preferred, however, that the total comonomer concentration should not exceed about 20%, by weight, of the resulting copolymer. Thus, the ratio of vinyl acetate to comonomer should range from about 80:20 to 99:1, by weight.

The vinyl acetate aqueous copolymer emulsions may be prepared by any of the aqueous emulsion polymerization techniques well known to those skilled in the art. These techniques generally involve the emulsion polymerization of the respective monomers in the presence of a free radical type catalyst. The reaction is usually conducted under agitation at temperatures in the range of from 60 to 80° C. In most cases, the reaction will require from 3 to 6 hours, with the exact time depending on the particular catalyst and the concentration in which it is used, as well as the particular polymerization technique which is employed. For the purposes of our invention, these emulsion polymers may contain any total solids content which may be desired by the practitioner. It should be noted, however, that the practical total solids range is from about 40 to 60%, by weight. In addition, the resulting polymers will usually have a minimum intrinsic viscosity of about 0.4, as determined in acetone at 25° C.

In preparing the adhesive compositions of this invention, one may combine the previously prepared aqueous vinyl acetate copolymer emulsion with a hydrocolloid such as polyvinyl alcohol. Generally, however, the hydrocolloid is added to the monomer-water blend prior to polymerization, whereby it acts as the primary emulsifier or stabilizer for the monomer in the preparation of aqueous emulsions. Thus, one would add from about 2 to 12% of the hydrocolloid, as based upon the total weight of the initial monomer charge, i.e. the total weight of monomers in the polymerization recipe. The presence of small quantities of a wetting agent such, for example, as sodium lauryl sulfate, dioctyl sodium sulfosuccinate, or various alkyl aryl benzene sulfonates, etc. is optional. The final emulsion should contain from about 2 to 12% of the hydrocolloidal, as based on the weight of the vinyl acetate copolymer resin solids. Emulsions containing less than about 2%, by weight, of such a hydrocolloid are too unstable for practical use, while those emulsions containing more than about 12%, by weight, of the hydrocolloid exhibit poor water resistance.

As has been previously indicated, the addition of acidic, metal salt curing agents to the above described blends is of prime importance. Thus, the primary function of these curing agents is to cure or crosslink the adhesive coatings or films derived from the adhesive compositions of this invention as well as to enhance certain properties of these coatings and films such as their water resistance. The acidic nature of these agents also serves to accelerate the curing procedure.

The preferred curing agents for use in the process of this invention comprise acidic, metal salts selected from the group consisting of chromic nitrate, aluminum chloride, aluminum nitrate, and chromic perchlorate. These curing agents may be added to our adhesives at the time the latter formulations are to be utilized, or, if added earlier, they should be introduced no sooner than about 48 hours prior to such utilization. The use of these acidic, metal salts instills water resistance to a far greater degree than is possible with the use of the corresponding free acids.

The proportion of metal salt added depends on the desired degree of cure. However, it has been found impractical to add more than about 0.12 gram equivalents of curing agent (anhydrous basis) per each 100 grams of the total emulsion weight, i.e. total solids plus water, since the adhesive formulations containing such excessive concentrations of curing agent are ordinarily quite corrosive. The lower practical limit for the concentration of curing agent solids has been found to be about 0.01 gram equivalents, per each 100 grams of the total emulsion weight, i.e. total solids plus water, inasmuch as formulations containing less than this lower limit usually display poor water resistance.

It should be noted that hydrogen peroxide, which is sometimes utilized as an additional ingredient of adhesives based upon vinyl ester emulsion polymer systems, is not applicable for use in the novel adhesive products of this invention. Thus, it has been found that the addition of hydrogen peroxide to our adhesives is highly undesirable inasmuch as it has the effect of drastically reducing the bond strength of the substrates adhered with such formulations upon their exposure to boiling water.

Our adhesives may be used in the bonding, saturation or lamination of many types of solid substrates, such as wood, tempered hardboard, textiles, leather, paper, cement asbestos board and related products as well as for the manufacture of such products as plywood and wood particle board. One application for which our adhesives have proven to be particularly useful is for the bonding of so-called "finger joints." These finger joints are employed in the lumber industry where it is desirable to make use of the smaller sections of wood that would normally be impractical to use. This can now be accomplished by joining these smaller sections with adhesives and a common procedure for this purpose involves the cutting of the mating edges of the lumber into interlocking, mating fingers which are subsequently glued together.

Another interesting application for our adhesives involves their use in the construction of laminated beams for arches and other supporting structures wherein lumber is laminated so as to obtain the desired dimensions of the final beam. Our adhesives may also be used in the construction of so-called "curtain wall panels." These panels comprise prefabricated wall panels which are made by binding skin materials such as metals, cardboard, plywood, glass and asbestos board, etc. to cores such as foamed plastics, honeycomb cores, insulation board and particle board, etc.

When adhering substrates which have been coated with our compositions, wet combining methods are used. The freshly coated substrates may be adhered at room temperature, under pressures of from about 30 to 300 p.s.i. which are applied for periods of from about ½ to 3 hours. By increasing the temperature, both the pressure and the press time will, of course, be reduced proportionately.

The following examples will further illustrate the embodiment of our invention. In these examples, all parts given are by weight unless otherwise noted.

EXAMPLE I

This example illustrates the preparation of a number of different adhesive formulations typical of this invention.

The following table presents the complete data for the formulations which were produced. In preparing these formulations, the procedure utilized involved the polymerization of vinyl acetate copolymers with polyvinyl alcohol added to the respective recipes as an emulsifier. The curing agent, in the form of an aqueous solution, was added to the stabilized emulsion just prior to its use as an adhesive.

| Nature of vinyl acetate polymer | Ratio of ViAc: comonomer | Percent, by weight, resin solids in emulsion | Grams polymer emulsion in formulation | Grams polyvinyl alcohol solids | Curing agent | Gram equivalents curing agents per 100 grams emulsion |
|---|---|---|---|---|---|---|
| Copolymer with ethyl acrylate | 87:13 | 50 | 100 | 6.0 | Al (NO$_3$)$_3$ | 0.04 |
| Copolymer with ethyl acid maleate | 97:3 | 50 | 100 | 6.0 | Cr (NO$_3$)$_3$ | 0.05 |
| Copolymer with acrylic acid | 98:2 | 55 | 100 | 1.1 | AlCl$_3$ | 0.03 |
| Copolymer with crotonic acid | 97:3 | 45 | 100 | 4.0 | Cr (NO$_3$)$_3$ | 0.08 |
| Copolymer with dibutyl fumarate | 80:20 | 55 | 100 | 6.0 | Cr(ClO$_4$)$_3$ | 0.08 |
| Copolymer with octyl acrylate | 80:20 | 50 | 100 | 6.0 | Cr (ClO$_4$)$_3$ | 0.08 |
| Copolymer with acrylamide | 96:4 | 50 | 100 | 4.5 | Cr (NO$_3$)$_3$ | 0.06 |
| Copolymer with N-methylol acrylamide | 95:5 | 50 | 100 | 5.0 | Cr (NO$_3$)$_3$ | 0.01 |
| Do | 98.8:1.2 | 50 | 100 | 3.0 | Cr (NO$_3$)$_3$ | 0.04 |
| Do | 98.8:1.2 | 50 | 100 | 3.0 | AlCl$_3$ | 0.04 |
| Terpolymer with dibutyl fumarate and acrylic acid | 80:18:2 | 50 | 100 | 6.0 | Cr (NO$_3$)$_3$ | 0.04 |

Each of the above described formulations were successfully employed as adhesives for the bonding of a wide variety of wood, plastic and metal surfaces. The resulting adhesive bonds were, in all cases, superior to the bonds achieved with unmodified polyvinyl acetate-polyvinyl alcohol adhesive blends with regard to such factors as resistance to static loading and heat resistance of the cured films. This superiority was especially noted in the water resistance exhibited by the cured films of the adhesive systems of this invention.

EXAMPLE II

This example illustrates the high degree of water resistance exhibited by the modified adhesive compositions of this invention when compared with: (1) polyvinyl acetate-polyvinyl alcohol stabilized emulsions which were devoid of acidic, metal salt curing agents; (2) polyvinyl acetate-polyvinyl alcohol stabilized emulsions catalyzed with conventional acid catalysts; and (3) polyvinyl acetate-polyvinyl alcohol stabilized emulsions blended with conventional insolubilizers.

In preparing the adhesive compositions of this example, a 96:4 vinyl acetate:ethyl acid maleate copolymer emulsion containing 50%, by weight, resin solids and having an intrinsic viscosity of 0.75, as determined in acetone at 25° C., was prepared using 8% polyvinyl alcohol, as based on the total weight of the initial monomer charge, as the emulsion stabilizer.

Various formulations, comprising this copolymer either by itself or in combination with other components, i.e. curing agents, free acids, etc. which were added in the form of aqueous solutions, were used to adhere plywood veneers. Thus, the various adhesive formulations were applied, in a 6 mil wet film, to one surface of a number of 1/16" thick birchwood veneers. Three of these veneers were then compressed for three hours under a pressure of 75 p.s.i. and a temperature of 75° F. so as to result in the formation of a three ply panel. These specimens were then aged for seven days prior to their being subjected to the tests described below.

In order to compare relative strength and water resistance, a cold water soak test was run on a set of 1" x 6" splints, as prepared by the procedure described hereinabove, wherein the resulting splints were soaked in water at 72° F. for a period of 48 hours. While still wet, the tensile shear strength, in p.s.i., of the adhesive bonds of these plywood test specimens was determined using an Instron Tensile Tester at a rate of shear of 0.2 inches per minute. This procedure conforms with Federal Test Method Standard No. 175, entitled "Adhesives: Methods of Testing," Method 2031, procedure 4.1.

The various adhesive formulations employed in the aforedescribed procedure are set forth in the following table. The total weight of the respective copolymer emulsions is presented in grams, while the concentrations of the various additives, i.e. curing agents, free acids, conventional acid catalysts, etc., is presented in gram equivalents.

| Components | Formulation number | | | | | | | | |
|---|---|---|---|---|---|---|---|---|---|
| | 1 | 2 | 3 | 4 | 5 | 6 | 7 | 8 | 9 |
| Vinyl acetate-copolymer-polyvinyl alcohol emulsion[1] | 100 | 100 | 100 | 100 | 100 | 100 | 100 | 100 | 100 |
| Chromic nitrate | | 0.04 | | | | | | | |
| Aluminum nitrate | | | 0.04 | | | | | | |
| Aluminum chloride | | | | 0.04 | | | | | |
| Chromic perchlorate hexahydrate | | | | | 0.04 | | | | |
| 20% nitric acid | | | | | | 0.04 | | | |
| 37% hydrochloric acid | | | | | | | 0.04 | | |
| Chromic acetate monohydrate | | | | | | | | 0.04 | |
| Stearate chromic chloride | | | | | | | | | 0.04 |

[1] As described hereinabove

The results obtained by employing the above described formulations in the test procedure heretofore described, are set forth in the following table:

| Formulation No.: | Wet shear strength test, average p.s.i. |
|---|---|
| 1 | *0 |
| 2 | 185 |
| 3 | 210 |
| 4 | 190 |
| 5 | 200 |
| 6 | *0 |
| 7 | *0 |
| 8 | *0 |
| 9 | *0 |

* 3-ply panel voluntarily separated while immersed in water.

It can be seen from the results noted in the above table, that the adhesive compositions of our invention yielded bonds which were vastly superior in water resistance to the other formulations tested.

EXAMPLE III

This example illustrates the high degree of water resistance exhibited by the modified adhesive compositions of this invention when compared with: (1) polyvinyl acetate based adhesive formulations; and (2) adhesive formulations wherein hydrogen peroxide is present as an optical ingredient.

Various adhesive formulations, as described in the following table, were prepared according to the procedure set forth in Example I, hereinabove. The total weights of the respective copolymer emulsions and the polyvinyl alcohol are presented in the table in grams, while the concentrations of the curing agents are presented in gram equivalents.

| Components | Formulation number | | | |
|---|---|---|---|---|
| | 1 | 2 | 3 | 4 |
| An aqueous emulsion of polyvinyl acetate containing 55%, by weight, of resin solids | 100 | | | |
| An aqueous emulsion of a 97:3 vinyl acetate: cyanoethyl half ester of maleic acid copolymer containing 50%, by weight, of resin solids | | 100 | | |
| An aqueous emulsion of a 97:3 vinyl acetate: N-methylol acrylamide copolymer containing 50%, by weight, of resin solids | | | 100 | |
| An aqueous emulsion of a 97:3 vinyl acetate: N-methylol acrylamide copolymer containing 50%, by weight, of resin solids to which has been added 1.5%, by weight, of hydrogen peroxide | | | | 100 |
| Polyvinyl alcohol | 1.25 | 3.0 | 1.5 | 1.5 |
| Chromic nitrate | 0.03 | 0.03 | 0.03 | 0.03 |

Each of the thus prepared adhesive formulations were then applied, in a 6 mil wet film, to one surface of a number of 1/16" thick birchwood veneers. An uncoated piece of veneer was then placed between two of the coated veneers and compressed, for 2 minutes, under a pressure of 75 p.s.i. and a temperature of 250° F. so as to result in the formation of a three ply panel, part of which was then cut into 1" x 3¼" test specimens which were, of course, 3/16" thick. These specimens were then aged for seven days prior to their being subjected to the tests described below.

In order to compare the relative strength and water resistance of the resulting adhesive bonds, a number of these 1" x 3¼" x 3/16" three ply specimens were immersed in boiling water for four hours whereupon they were placed in a drying oven set at a temperature of 145° F. for a period of 20 hours. They were then immersed in boiling water for an additional four hours after which the water was cooled to 72° F. by the addition of cold water. While still wet, the tensile shear strength, in p.s.i., of the adhesive bonds of these plywood test specimens was determined using an Instron Tensile Tester at a rate of shear of 0.2 inch per minute.

The above described test procedure conforms to the cyclic boil test for Type I hardwood plywood as established by the U.S. Department of Commerce, Commercial Standard CS-35-56, which is used to evaluate commercial grades of hardwood plywood and is also used in setting up adhesive requirements for applications other than plywood, i.e. curtain wall panels, finger joints, and laminated beams, etc.

The results obtained by employing the above described formulations in the test procedures heretofore described are set forth in the following table:

Formulation No.: Boil test, average p.s.i.
1 _____ *0
2 _____ 146
3 _____ 333
4 _____ 40

* 3-ply panel voluntarily separated while immersed in water.

It can be readily seen, from the results presented in the above table, that when the adhesive compositions of this invention are prepared with a vinyl acetate homopolymer base or with hydrogen peroxide as an additional ingredient, the adhesive bonds derived therefrom have little or no resistance to boiling water whereas those formulations based solely upon copolymers of vinyl acetate are remarkably resistant to boiling water.

EXAMPLE IV

This example illustrates the range for the preferred concentration of polyvinyl alcohol which is to be used in the adhesive compositions of this invention. It further illustrates the undesirable effects resulting from the use of concentrations of polyvinyl alcohol falling outside this range.

In preparing the adhesive compositions employed in this example, an aqueous emulsion of a 97:3 vinyl acetate:N-methylol acrylamide copolymer containing 50%, by weight, resin solids was prepared using 1.7% of polyvinyl alcohol (88% hydrolyzed, medium viscosity), as based on the total weight of the initial monomer charge, as the emulsion stabilizer.

Various formulations, as described in the following table, comprising the above noted copolymer blend in combination with aqueous solutions of cromic nitrate and varying amounts of additional polyvinyl alcohol were utilized to prepare three ply birchwood plywood by means of the procedure described in Example II, hereinabove.

The total weight of the respective copolymer emulsions as well as the additional amount of polyvinyl alcohol which was introduced is presented in the table in grams, while the concentrations of the curing agent are presented in gram equivalents.

| Components | Formulation number | | | | | | |
|---|---|---|---|---|---|---|---|
| | 1 | 2 | 3 | 4 | 5 | 6 | 7 |
| Vinyl acetate copolymer-polyvinyl alcohol emulsion (as described hereinabove) | 100 | 100 | 100 | 100 | 100 | 100 | 100 |
| 20%, by weight, aqueous polyvinyl alcohol solution | | 1.0 | 3.0 | 10.0 | 26.5 | 40.0 | 60.0 |
| Chromic nitrate | 0.05 | 0.05 | 0.05 | 0.06 | 0.07 | 0.07 | 0.08 |
| Total percent polyvinyl alcohol in formulation, as based on the weight of vinyl acetate copolymer resin solids | 1.7 | 2.1 | 2.9 | 6.7 | 12.0 | 17.7 | 25.7 |

The results obtained by employing the above described formulations in the test procedure described in Example II, are set forth in the following table:

Formulation No.: Wet shear strength test, Average p.s.i.
1 _____ (¹)
2 _____ 190
3 _____ 220
4 _____ 200
5 _____ 180
6 _____ 75
7 _____ ²0

² 3 ply panel voluntarily separated while immersed in water.

The results summarized above clearly indicate the necessity for incorporating polyvinyl alcohol into the adhesive compositions of this invention in concentrations ranging from about 2 to 12%, as based on the weight of vinyl acetate copolymer resin solids.

Summarizing, our invention provides adhesive products based on vinyl acetate copolymers which yield bonds exhibiting optimum water resistance and high strength.

By "optimum water resistance," as used herein and in the claims hereof, is meant a degree of water resistance on the part of the adhesive bonded laminate such that when it is immersed in water, the laminate will not exhibit any ply or laminae separation but will, rather, yield a bond strength substantially in excess of commercial standards. Variations may, of course, be made in procedures, proportions, and materials without departing from the scope of our invention which is defined by the following claims.

We claim:

1. An adhesive composition capable of yielding dry films which are characterized by their optimum water resistance, said adhesive composition consisting essentially of a mixture of (a) an aqueous emulsion of a vinyl acetate copolymer containing from about 80–99%, by weight, of vinyl acetate copolymerized with at least one polymerizable monomer selected from the class consisting of alkyl esters of acrylic acid; alkyl esters of methacrylic acid; alpha, beta-unsaturated dicarboxylic acids; dialkyl esters of alpha, beta- unsaturated dicarboxylic acids; alpha, beta-unsaturated carboxylic acids; vinyl halides; vinylidene halides; amides of alpha, beta-unsaturated carboxylic acids; and N-alkylol derivatives of amides of alpha, beta-unsaturated carboxylic acids; (b) polyvinyl alcohol in a concentration of from about 2 to 12% based on the weight of the vinyl acetate copolymer resin solids; and (c) an acidic, metal salt curing agent selected from the group consisting of chromic nitrate, chromic perchlorate, aluminum nitrate and aluminum chloride, said acidic, metal salt being added to the preformed emulsion of (a), and said acidic metal salt being present in a concentration of from about 0.01 to 0.12 gram equivalents per each 100 grams of the total emulsion weight.

2. A solid substrate coated with a dried adhesive film exhibiting optimum water resistance, said film being deposited from an aqueous adhesive composition consisting essentially of a mixture of (a) an aqueous emulsion of a copolymer containing from about 80–99%, by weight, of vinyl acetate with at least one polymerizable monomer selected from the class consisting of alkyl esters of acrylic acid; alkyl esters of methacrylic acid; alpha, beta-unsaturated dicarboxylic acids; monoalkyl esters of alpha, beta-unsaturated dicarboxylic acids; dialkyl esters of alpha, beta-unsaturated dicarboxylic acids; alpha, beta-unsaturated carboxylic acids; vinyl halides; vinylidene halides; amides of alpha, beta-unsaturated carboxylic acids; and N-alkylol derivatives of amides of alpha, beta-unsaturated carboxylic acids; (b) polyvinyl alcohol in a concentration of from about 2 to 12% based on the weight of the vinyl acetate copolymer resin solids; and (c) an acidic, metal salt curing agent selected from the group consisting of chromic nitrate, chromic perchlorate, aluminum nitrate and aluminum chloride, said acidic, metal salt having been added to the preformed emulsion of (a), and said acidic metal salt being present in a concentration of from about 0.01 to 0.12 gram equivalents per each 100 grams of the total emulsion weight.

3. A laminate comprising at least two laminae, said laminae being adhesively bonded with a dried adhesive film exhibiting optimum water resistance, said film being deposited from an aqueous adhesive composition consisting essentially of a mixture of (a) an aqueous emulsion of a copolymer containing from about 80–99%, by weight, of vinyl acetate with at least one polymerizable monomer selected from the group consisting of alkyl esters of acrylic acid, alkyl esters of methacrylic acid; alpha beta-unsaturated dicarboxylic acids; mono-alkyl esters of alpha, beta-unsaturated dicarboxylic acids; dialkyl esters of alpha, beta-unsaturated dicarboxylic acids; alpha, beta-unsaturated carboxylic acids; vinyl halides; vinylidene halides; amides of alpha, beta-unsaturated carboxylic acids; and N-alkylol derivatives of amides of alpha, beta-unsaturated carboxylic acids; (b) polyvinyl alcohol in a concentration of from about 2 to 12% based on the weight of the vinyl acetate copolymer resin solids; and, (c) an acidic metal salt curing agent selected from the group consisting of chromic nitrate, chromic perchlorate, aluminum nitrate and aluminum chloride, said acidic salt having been added to the preformed emulsion of (a), and said acidic metal salt being present in a concentration of from about 0.01 to 0.12 gram equivalents per each 100 grams of the total emulsion weight.

References Cited

UNITED STATES PATENTS

| | | | |
|---|---|---|---|
| 2,346,755 | 4/1944 | Hemming | 260—29.6 WA |
| 2,465,295 | 3/1949 | Strauss | 260—29.6EMM |
| 2,588,543 | 3/1952 | Kunze et al. | 260—29.6WA |
| 2,833,737 | 5/1958 | Mark et al. | 260—29.6EM |
| 3,051,668 | 8/1962 | Bauer et al. | 260—29.6EMM |
| 3,300,430 | 1/1967 | Armour et al. | 260—29.6EMM |
| 3,274,048 | 9/1966 | Armour et al. | 260—29.3 |
| 3,301,809 | 1/1967 | Goldberg et al. | 260—29.6 |

FOREIGN PATENTS

| | | | |
|---|---|---|---|
| 777,447 | 6/1957 | Great Britain | 260—29.6EM |

OTHER REFERENCES

DuPont Technical Bulletin, "Water Emulsions of Polyvinyl Acetate."

MURRAY TILLMAN, Primary Examiner

H. ROBERTS, Assistant Examiner

U.S. Cl. X.R.

117—127, 142, 148, 155, 161; 156—327, 331; 161—215, 218, 254; 260—29.6, 874, 899, 901